US006453256B1

(12) United States Patent
Gordon et al.

(10) Patent No.: US 6,453,256 B1
(45) Date of Patent: Sep. 17, 2002

(54) SYSTEM AND METHOD FOR AUTOMATICALLY PROCESSING AND CALIBRATING DATA FROM A CURRENT MEASURING DEVICE

(75) Inventors: Raymond Lee Gordon, San Diego, CA (US); Atle Lohrmann, Oslo (NO)

(73) Assignee: Nortekusa, LLC., San Diego, CA (US)

( * ) Notice: Subject to any disclaimer, the term of this patent is extended or adjusted under 35 U.S.C. 154(b) by 0 days.

(21) Appl. No.: 09/285,493

(22) Filed: Apr. 2, 1999

(51) Int. Cl.⁷ .............................................. G06F 17/00
(52) U.S. Cl. ................. 702/85; 702/2; 702/3; 702/100
(58) Field of Search ............................. 702/85, 1–3, 5, 702/12, 14, 16, 45, 48, 50, 54, 81–83, 92–96, 100, 103, 104, 108, 127, 153, 142, 143, 166, 183, 187, 188, FOR 100, FOR 101, FOR 137, FOR 141, FOR 150, FOR 106, FOR 104, FOR 127, FOR 128, FOR 139, FOR 156–FOR 163, FOR 170, FOR 171; 73/1.16, 1.37, 1.35, 178 R, 181, 170.01, 170.02, 170.03, 170.11–170.13, 170.29, 170.31, 861.02, 861.03, 861.18, 861.25; 367/89–91, 904; 405/21

(56) References Cited

U.S. PATENT DOCUMENTS 4,782,697 A * 11/1988 Williams, III ............ 73/170.13
5,694,372 A * 12/1997 Perennes .................. 73/170.13
6,052,334 A *  4/2000 Brumley et al. ............... 367/90

OTHER PUBLICATIONS

Flagg et al., "Operating an acoustic doppler current profiler aboard a container vessel," *Journal of Atmospheric and Oceanic Technology* 15:257–271 (1998), (No month).

Griffiths, "Using 3DF GPS heading for improving underway ADCP data*," *Journal of Atmospheric and Oceanic Technology* 11:1135–1143 (1994), (No month).

Joyce, "On in situ 'calibration' of shipboard ADCPs*," *Journal of Atmospheric and Oceanic Technology* 6:169–172 (1989), (No month).

* cited by examiner

*Primary Examiner*—Hal Wachsman
(74) *Attorney, Agent, or Firm*—Lyon & Lyon LLP

(57) ABSTRACT

A system, method and computer-program product for automatically calibrating a current measuring device. The system and method includes a means for automatically determining viable data segments that can be used for calibration purposes. A quality factor that is associated with each calibration realization is provided. The quality factor is an assessment of the quality of the data in a viable data segment as determined based on user input, statistical information, and the validity of the assumptions used to calculate the calibration coefficient.

21 Claims, 10 Drawing Sheets

SYSTEM AND METHOD FOR AUTOMATICALLY PROCESSING AND CALIBRATING DATA FROM A CURRENT MEASURING DEVICE

BACKGROUND OF THE INVENTION

1. Field of the Invention

The present invention relates generally to current measuring devices, and more particularly to a system and method for automatically processing and calibrating data from a current measuring device.

2. Related Art

For several decades, scientists have been measuring the direction and velocity of water currents for a variety of reasons. For example, oceanographers and seismologists often profile ocean currents at various depths for scientific study. In addition, ocean currents are often measured to provide information to support offshore drilling operations and the like. Currents have also been measured in smaller bodies of water, such as rivers, for example, to compute flow and river discharge.

Typically, currents are measured from moving vessels ranging in size from small rafts to large ocean-going ships. Current measuring devices (also referred to herein as "current sensors" and "transducers") are typically mounted in the midsection of a ship's hull. The current sensors measure the direction and velocity of currents at one or more predefined depths at repeating intervals of time.

An example of a presently used type of current sensor is an acoustic Doppler current profiler ("ADCP" or "ADP") device. Examples of such devices are the VM-ADP, manufactured by Nortek AS of Oslo, Norway, and the VM-ADCP, manufactured by RD Instruments of San Diego, Calif. These current sensors transmit and receive sound waves and calculate current velocity and direction based on the Doppler shift of the transmitted sound waves.

The current sensors themselves often provide all of the information necessary to compute the direction and velocity of currents to the satisfaction of the user. However, many users require more precise data and must rely on systems that incorporate data from external navigational devices such as gyrocompasses, GPS receivers and the like.

These external devices are used to calibrate the system so that current measurements can be independent of the ship's hull, velocity and the orientation of the transducer itself. Thus, calibration is a very important issue that controls not only the quality of the data being collected, but also the usability of the entire system. Accordingly, a calibration coefficient must be calculated to account for the components in the current measurement dataset that are caused by the orientation offset of the transducer, the ship's rotation, and the currents interfering with the ship's hull.

Generally currents are measured as vectors relative to the vessel's frame of reference. However, users generally need the current flow data relative to the fixed earth frame of reference. Thus, the collected data must be transformed to the reference frame of the earth. This transformation generally has three parts: the rotation of the measured current velocity to a direction relative to true north; a scale factor correction of the measured velocity; and the removal of the velocity of the vessel relative to the earth.

Well-known calibration algorithms and techniques are in general use today as evidenced by the following three articles published in the *Journal of Atmospheric and Oceanic Technology* (by the America Meteorological Society): Terrence M. Joyce, *On In Situ "Calibration of Shipboard ADCPs* (1989); Gwyn Gfiffiths, *Using 3D GPS Heading for Improving Underway ADCP data* (1994); and C. N. Flagg, et al, *Operating an Acoustic Doppler Current Profiler aboard a Container Vessel* (1998). The preceding three articles are hereby incorporated herein by reference.

The problem is that calibrating present current measuring systems require an enormous amount of effort and expert knowledge. For example, in the above referenced article by Flagg et al. it is stated that: "[T]he calibration of the ADCP's heading offset and velocity scaling is very time consuming, but fortunately only needed to be performed when the transducer was reinstalled during dry-docking and when the AGPS was installed." In the preceding quotation, the AGPS is a presently used navigation system.

Using present systems, many manual steps are required to successfully calibrate a vessel-mounted current measurement system. These steps include navigating the vessel through a predefined course, manually examining the collected data, determining an appropriate algorithm, averaging the data, manually calculating the calibration coefficient by solving one or more equations, and manually entering the calibration coefficient into a computer program. These manual steps not only allow for the introduction of many errors, but also generally require advanced skills and expert knowledge. More specifically, the steps required by present systems in use today can be generalized by the following seven steps listed below.

1. Locate and move the ship to an appropriate site for calibration. Calibration sites are chosen for the presence of weak or steady currents or for the ability to effectively bottom- track. Steady currents are required for the success of some calibration methods. Bottom-tracking refers to a well-known method where current sensors are used to directly measure the vessel's velocity over the sea bed. Bottom-tracking is not possible unless the water depth is shallow enough so that the transducer can track the sea bed. In addition, bottom tracking is prone to errors in smaller bodies of waters where moving sediment at the bottom can introduce errors.

2. Move the ship through an appropriate course within the site. A typical pattern is one in which the ship moves over a course, then quickly reverses and covers the same course heading the opposite direction. Once this is performed, the user generally must assess whether the course was adequate for the calibration.

3. Manually identify the course segments (i.e. start/stop times) to be used for the calibration computations. Typically, this involves keeping a steady course and coordinating latitude and longitude data with physical observations made by the user to identify a proper course segment.

4. Screen the data for quality: reject bad data points and assess whether the overall data quality is adequate for calibration.

5. Compute average velocities from each segment, where each raw velocity estimate is rotated by the ship's heading.

6. Solve one or more equations to obtain the one or more calibration coefficients.

7. Enter the calibration coefficients into real-time and/or post-processing software, keeping track of signs, offsets and scale factors.

As can be imagined, these steps have proven to be not only burdensome and difficult, but time consuming and prone to errors. In addition, users having a high degree of skill and knowledge are generally required to perform the above steps. Sometimes it is difficult or impossible to take make calibration runs, as indicated by step 2, above. For example, it is difficult, costly, and time consuming for seismic survey ships to turn around and repeat a course for the purposes of making a calibration run.

Further, due to the difficulty in performing these steps using the conventional methods outlined above, the steps are generally performed only once, and some steps may be skipped altogether. This can lead to erroneous data.

Therefore, what is needed is a system and method facilitating the calibration of oceanographic current measuring systems.

SUMMARY OF THE INVENTION

Accordingly, the present invention is directed toward a system and method for automatically calibrating an oceanographic current measuring device, that requires limited and non-expert human intervention. One feature of the present invention is that a system can be calibrated without requiring users to perform specific calibration runs. Another feature of the present invention is that multiple realizations of calibrations can be effortlessly performed.

The automated system and method of the present invention includes a means for automatically determining viable data segments that can be used for calibration purposes. A raw current dataset is defined herein as a current dataset comprising uncalibrated current data as measured by the current sensor.

During or after the construction of a raw current dataset, the present invention processes the data to determine the existence of one or more calibration opportunities. This is accomplished by searching the dataset for particular patterns in accordance with one or more particular calibration methods. Once a calibration opportunity is found, the present invention calculates a calibration coefficient therefrom. In addition, a preferred embodiment of the present invention calculates a quality factor associated with each calibration coefficient.

The quality factor is based on operating conditions and other factors that relate to the validity of the assumptions made in calculating the associated calibration coefficient. User input can also be used in determining a quality factor. In one embodiment, a user database is constructed based on answers to interrogatories presented in the form of an on-line questionnaire. This database is used to determine available calibration methods for a particular survey and may be used to influence the selection of a particular calibration coefficient.

Calibration coefficients and their associated quality factors are stored in a calibration realization table. A selection algorithm is used to select the best calibration or most optimal coefficient from the realization table. A calibrated current dataset is constructed from the selected calibration coefficient. Users can also specify which calibration coefficient to be used. The present invention assists the user in this task by presenting statistical information and quality data related to the multiple realizations of the calibration coefficients.

Users can also specify particular start and stop data points of a particular data segment that is to be used for calculating a coefficient. For example, in one embodiment, the user specifies to the system that a calibration run is about to begin. The user can also specify the end of the calibration run. In addition, the user can, at any time, force the system to calculate a calibration coefficient based on a specified data segment.

Further, users can change parameters used to identify the calibration opportunities. In one embodiment, the present invention automatically searches back through the raw current dataset to re-evaluate calibration opportunities, whenever parameters are changed by the user.

In another embodiment the present invention performs post processing on a raw current dataset. That is, in one embodiment, the present invention is used to post-process data previously collected in order to find the best possible calibration coefficient. The calibration coefficient is then used to re-create a calibrated current dataset. In this fashion, any previously collected dataset, including those in historical archives, can be used with the present invention so that more accurate results are obtained therefrom.

In one embodiment, the present invention assists the user in making calibration runs by dynamically displaying the vessel's path in real-time. The visual display typically includes an optimal track to assist in the navigation process.

An advantage of the present invention is that it continuously evaluates the raw current dataset real-time to automatically determine the best calibration method.

Another advantage of the present invention is that it continually assesses the quality of the data and updates the calibration coefficient whenever necessary.

Another advantage of the present invention is that a system can be calibrated without requiring users to perform specific calibration runs.

Another advantage of the present invention is that multiple realizations of calibrations can be effortlessly performed.

Another advantage of the present invention is that is provides continual, automatic identification of suitable data for calibration during the normal course of data collection.

Another advantage of the present invention is that is provides guidance through standard calibration procedures and provides feedback to users on a real-time basis as to the quality of the calibration run.

Another advantage of the present invention is that is provides automated calibration using all available calibration methods, combined with continual quality assessment and evaluation so that up-to-date optimum of calibration is achieved.

Another advantage of the present invention is that is provides continual improvement of the calibration quality as new data suitable for calibration is obtained.

Another advantage of the present invention is that is provides automatic recalculation of previously collected data as the calibration changes and improves.

Another advantage of the present invention is that is provides upon-demand notification of the present quality of calibration in terms of the estimated uncertainty of measured data.

Another advantage of the present invention is that is provides visual feedback to allow users to assess the data used to form calibrations and to enable them to influence the process.

Another advantage of the present invention is that is provides highly knowledgeable users with access to recorded data in appropriate formats to allow them to independently reproduce calibration computations and verify the calibrations to their satisfaction.

Another advantage of the present invention is that it can be used by users having no previous expert knowledge or experience.

Another advantage of the present invention is that is provides opportunities for users to provide input to the calibration process on a sliding scale in accordance with their desires and abilities.

BRIEF DESCRIPTION OF THE FIGURES

The present invention is described with reference to the accompanying drawings, wherein.

In the figures, like reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENTS

Figure 1:
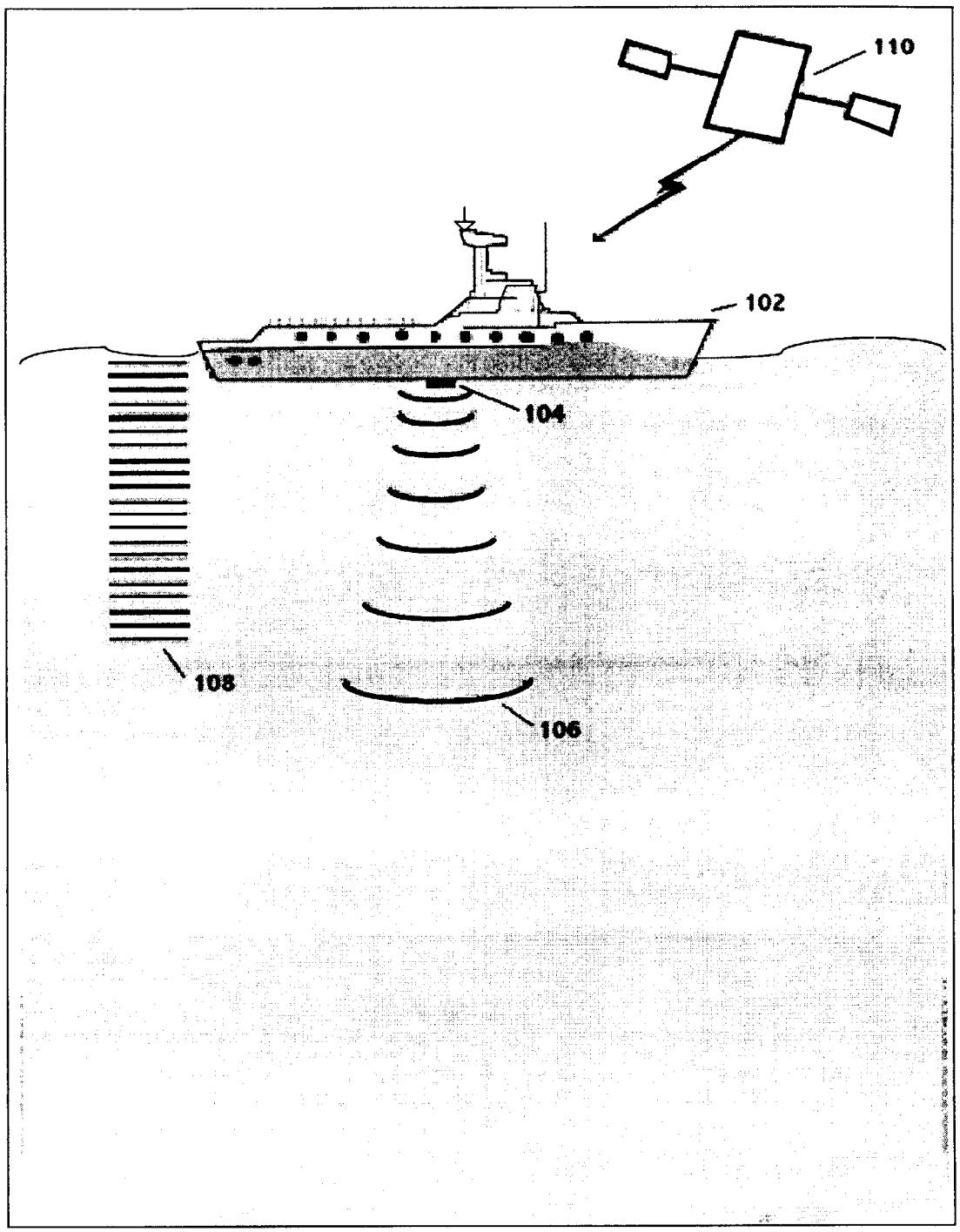
FIG. 1 depicts an operational environment according to an embodiment of the present invention.

FIG. 1 is a diagram depicting a typical operational environment in which the present invention is used. Current measurements are typically performed using a current sensor 104 mounted aboard a vessel, such as the ship 102. In this example. the current sensor 104 is an Acoustic Doppler Profiler (ADP), which transmits and receives a series of sound waves 106. Current velocity and direction are calculated based on the Doppler shift of the transmitted sound waves 106. The lines 108 illustrate that the sensor 104 typically performs current measurements at many different depths. Sensors measuring multiple depths are commonly referred to as current profilers.

Current measurements are typically repeated on a periodic basis, in accordance with pre-programmed parameters. A GPS satellite system, represented by the satellite 110, is typically used in conjunction with a GPS receiver (not shown) to determine the ship's 110 heading and speed. These factors are taken into account when determining current measurements, as described below.

Figure 2:
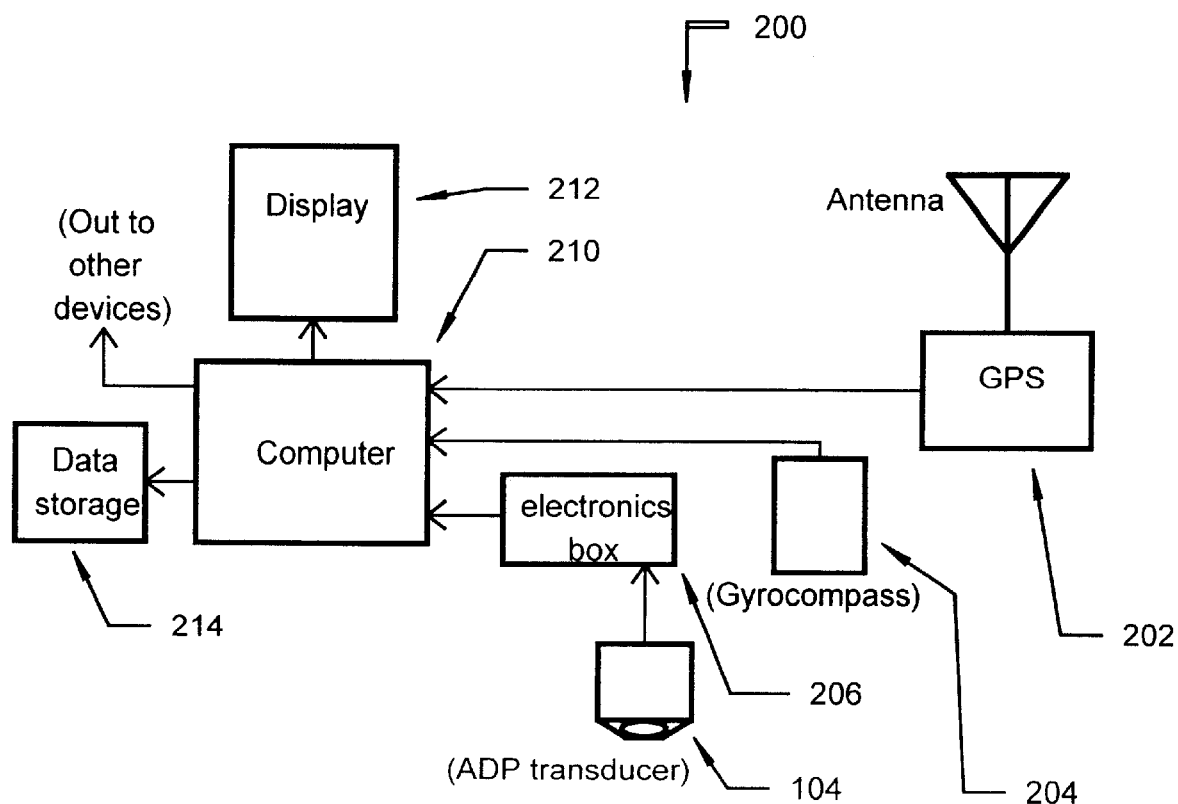
FIG. 2 is a block diagram depicting the components of a typical current measuring system.

FIG. 2 is a block diagram depicting the components of a typical current measuring system 200. The system comprises a GPS receiver 202. The GPS receiver 202 is used to track the vessel's travel speed and travel direction. A gyrocompass 204 is used to track the ship's heading. Note that ships heading, according to the gyrocompass 204, can be different from the ship's direction of travel, according to the GPS 202. This phenomenon is known as crabbing and is caused by water current and wind conditions. Both of these factors are taken into account to accurately process the current measuring data, as described below.

The system 200 also includes an ADP transducer 104 for measuring current, as described above. Transducer 104 is commonly connected to an electronics box 206 located in a space away from the hull. All of these devices, i.e. the sensor 104, the electronics box 206, the gyrocompass 204 and the GPS receiver 202, are coupled to a computer system 210. The computer system 210 can be any general purpose or special purpose computer system. An example of an exemplary computer system that can be used as block 210 of the present invention is shown below with reference to FIG. 10.

The computer system 210 accepts input data from the GPS receiver 202, the gyrocompass 204 and the current sensor 104, and stores the data in a data storage device 214. The data storage device 214 can be any type of data store, such as working memory, an optical storage device, a hard disk, tape or any other medium that can store data. The data collected and stored by the computer 210 is referred to herein as a "current dataset."

Figure 3:
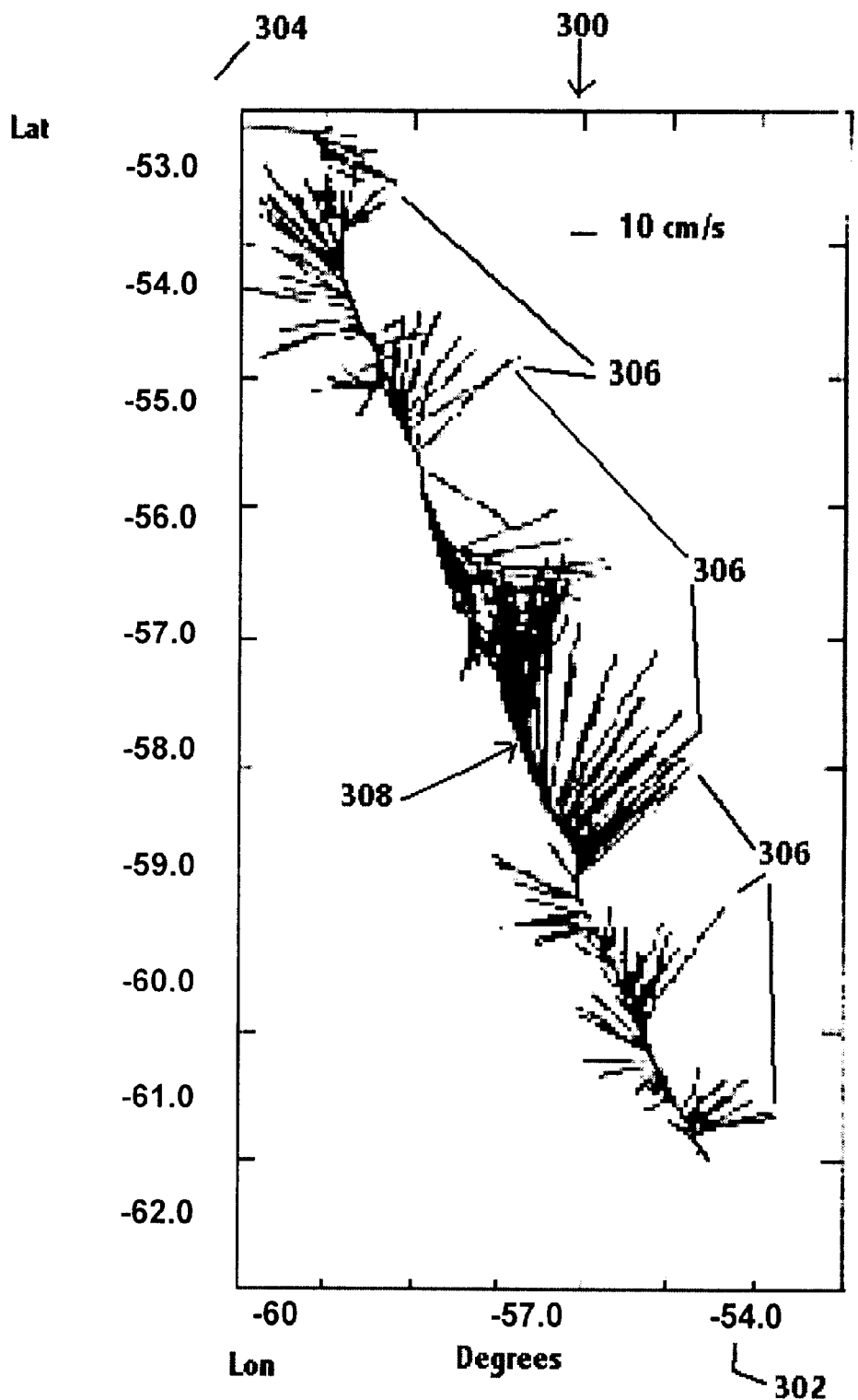
FIG. 3 is a graphical example of a current dataset.

FIG. 3 is an example of a current dataset represented in graphical format. In this chart, degrees of Longitude (Lon) are depicted along the X axis, and degrees of Latitude (Lat) are depicted along the Y axis. Lat/Lon information is continuously sent by the GPS receiver 202 to the computer 210 while the ship 102 travels along its path. The diagonal line 308, extending from the upper left corner to the lower right corner, represents the path taken by the ship 102. Current measurements from the transducer 104 are depicted as vectors (such as the vectors 306) emanating from the ships path 308. The length and direction of the vectors 306 represent current velocity and direction, respectively.

It is noted that for simplicity, the measured currents 306 are shown only for a single depth. As stated, in an actual current dataset, this information is repeated for each depth in which measurements are taken. It should also be noted that this graph actually depicts current data that has been adjusted so that the data is relative to the fixed earth frame of reference. Generally, raw data, collected from the current sensor 104 is relative to the vessel's 102 frame of reference. As such, the data shown in FIG. 3 is not actually raw data taken from the transducer 104. However, for the purposes of this diagram, which is meant only to describe the contents of a typical current dataset, this detail can be ignored.

The following description outlines several well-known methods used for calibrating vessel-mounted current measurement systems. Some of the methods described below can be performed on-board while the current data is being collected.

In the descriptions below, vectors are presented with the use of bold fonts and unit vectors are identified by a caret ($\hat{\ }$) mark. For clarity, vectors are cast as complex numbers, such that the real component represents East and the imaginary component represents North. In this fashion, vector rotations, which otherwise would require matrix arithmetic, are accomplished simply by multiplying by unit complex numbers. For example, $\hat{g}W_p$ rotates current velocity ($W_p$) measured relative to the platform by the platform's heading ($\hat{g}$).

A typical vessel-mounted current measurement system includes a number of sensors that measure the following parameters:

TABLE 1

Parameters measured by a typical current measured system.
In addition to the parameters listed below, systems typically measure
other parameters as well, including latitude, longitude, time,
water depth, etc.

| | |
|---|---|
| $W_p$ | Current velocity measured relative to the platform (subscript p) which has an arbitrary heading and which is itself moving relative to the earth (typically measured by current sensor) |
| $V_e$ | Vessel velocity relative to the earth (subscript e) (typically measured by GPS receiver) |
| $\hat{g}$ | platform heading (measured typically by gyrocompass) |

Current velocity relative to the earth $W_e$ is computed using the following equation:

$$W_e = R\hat{g}W_p + V_e \quad \text{equation (1)}$$

where R is a complex calibration coefficient that includes a scale factor (the magnitude of R) and a direction offset (the angle of R). The vectors $W_p$, $W_e$ and R can all vary with depth.

The calibration coefficient R contains several components as follows:

1. Scale factor (magnitude of R), which includes a multiplicative factor associated with the measurement itself plus a factor associated with the influence of the platform on the flow of the water (referred to as the "hull effect").
2. A direction offset (the angle of R), which includes an offset associated with the orientation of the current velocity sensing element relative to the vessel, compass offsets and flow directional changes associated with the hull effect.

Computation of the Calibration Coefficient

Because R cannot be computed with certainty at the time of installation, it generally must be obtained later with the use of measured data. In general, one or more assumptions are made to enable one to create of simultaneous equations that can be solved for R. The present invention enables one to compute R on a more frequent basis than was possible in the past so that more accurate data can be produced.

The first calibration method is referred to as the standard calibration method. The standard method relies on the use of reciprocal paths taken by a vessel, referred to as a calibration run. The calibration run requires a vessel to makes two passes over a specific path, but in opposite directions in a short time frame. The short time frame is required because the standard method assumes that the current velocity (speed and direction) remains constant from one pass to the next. Using this assumption, the following equation is created:

$$<W_e> = R<\hat{g}W_p>_1 + <V_e>_1 = R<\hat{g}W_p>_2 + <V_e>_2 \quad \text{Equation (2)}$$

In equation (2), <angle brackets> denote averages, and the subscripts (1 and 2) identify the pass number. The coefficient R may be taken outside the averages because R is constant. Solve for R to obtain:

$$R = \frac{\langle V_e \rangle_2 - \langle V_e \rangle_1}{\langle \hat{g}W_p \rangle_1 - \langle \hat{g}W_p \rangle_2} \quad \text{Equation (3)}$$

Equation (2) can be used to solve for the calibration coefficient in a variety of ways. For example, several methods are presented below, in which a different assumption is made to solve for the calibration coefficient R. As will be described in detail below, the present invention provides for the automatic intelligent selection of the best method to use for calibration. This decision is based on the particular operating conditions, and/or the interrogation of the current dataset as it is being compiled, and/or inputs from the user. In addition, the present invention derives a quality factor associated with each calculated calibration coefficient. In general, the quality factor is based on the relative validity of the assumptions in which the calibration coefficients are based. The quality factor enables one to select between methods and evaluate the quality of the data being collected.

In each of the methods below, a different assumption is made in order to solve for the calibration coefficient R. These example methods are labeled as methods A–H.

Method A

The standard calibration technique described above in which the currents in both directions are assumed to be equal. Recall that this method requires the ship to make a calibration run, in which a single path is traversed in opposite directions within a short period of time.

Method B

Bottom-track data is substituted for $W_p$. Using this method, the equation (2) becomes:

$$R<\hat{g}W_{pb}> + <V_e> = 0 \quad \text{Equation (4)}$$

Where $W_{pb}$ is the velocity relative to the sea-bed measured relative to the platform. This calibration is generally easier to implement than the standard calibration because a calibration run is not required. However, this method requires the ability to bottom track and it does not include corrections due to the hull effect. In general, bottom-tracking can only be implemented in water that is shallow enough, such that the transducer's range includes the bottom of the sea-bed.

Method C

Some ships stop routinely while surveying. By assuming that on the average the current stays constant around the times of these stops, one may create an equation in the form of equation (3) for each stop. In this case the averages are taken for a period while the ship is stopped plus a predefined period, (for example, five minutes), just prior to when or just after the ship stopped.

Method D

Some ships are unable to turn quickly, or ship owners may be unwilling to halt the ship's normal operations for the time required for method C. These ships can implement a variation on method C, in which the ship changes speed for short periods. In this case, the calibration uses a short period just prior to the slow down and a period during the slow-down, after the speed has stabilized.

Method E

Some ships cover wide areas of the ocean over which there is no single preferred current speed or direction. In this example, it is assumed that the average current is zero. Thus, the equation becomes:

$$R<\hat{g}W_p> + <V_e> = 0 \quad \text{Equation (5)}$$

where the average is taken over the entire cruise.

Method F

Some ships cruise back and forth in opposite directions in a series of tracks. This is referred to herein as a "radiator pattern" over the same general area. In this example, it is assumed that the average current relative to the cruise track is zero. To take advantage of this, the ship's velocity ($V_e$) is decomposed into speed $V_e$ and course heading $\hat{c}$, such that:

$V_e = \hat{c}V_e$. Equation (1) is then rewritten as follows:

$$V_e = \hat{c}^{-1}W_e - R\hat{g}\hat{c}^{-1}W_p \quad \text{Equation (6)}$$

Next, water current are expressed as mean and variable components as follows:

$$W_e = <W_e> + W'_e \quad \text{Equation (7)}$$

where $<W'_e> \equiv 0$. The average of equation (6) becomes:

$$<V_e> = <\hat{c}^{-1}><W_e> + <\hat{c}^{-1}W'_e> - R<\hat{g}\hat{c}^{-1}W_p> \quad \text{Equation (8)}$$

If the averaging interval is chosen, such that $<\hat{c}^{-1}>=0$, then the first term on the right vanishes. The middle term is a random variable with zero mean because both $\hat{c}^{-1}$ and $W'_e$ have zero mean and because they are uncorrelated with one another. Thus, we can write:

$$R = -<V_e>/<\hat{g}\hat{c}^{-1}W_p> \quad \text{Equation (9)}$$

Method G

Although flow is generally aligned with the hull of the ship, winds and waves may introduce side forces that cause the ship to crab relative to the flow. Nevertheless, over long periods, one may obtain the offset of the current sensor relative to the hull by observing the direction of flow relative to the hull, wherein:

$$\text{offset} = 180° - <\text{angle}(W_p)> \quad \text{Equation (10)}$$

where the 180° in the above reflects the fact that the apparent current flow is opposite in direction to the direction the ship is travelling. The offset includes both installation offsets plus rotations associated with the hull effect.

Method H

In the article by Griffiths, above, it is described how an intermittent but highly accurate 3D GPS can provide heading data to continually calibrate a compass. Using this method in addition to Method G, above can serve to keep track of the total directional offset contained in R.

As can be seen by the above examples, there are many ways in which to calibrate a vessel-mounted current sensing system. These are just examples of some of the more commonly used methods. Clearly additional methods will also be developed in the future. The example methods presented herein are described for exemplary purposes only and should not be construed to limit the scope and breadth of the present invention, which can be used with all presently known and future developed methods for calibrating a current sensing system.

It should be noted that none of these calibration methods are perfect nor are they always applicable in given situations. Each method depends on certain assumptions and some assumptions may prove to be more accurate than others, depending on each particular circumstance.

An advantage of the present invention is that it evaluates each particular circumstances in real-time on a continual basis to automatically determine the best calibration method to use in every case. Further, because circumstances change, the present invention continually assesses the quality of the data and updates the calibration coefficient whenever necessary. This may or may not involve switching between calibration methods.

Figure 4:
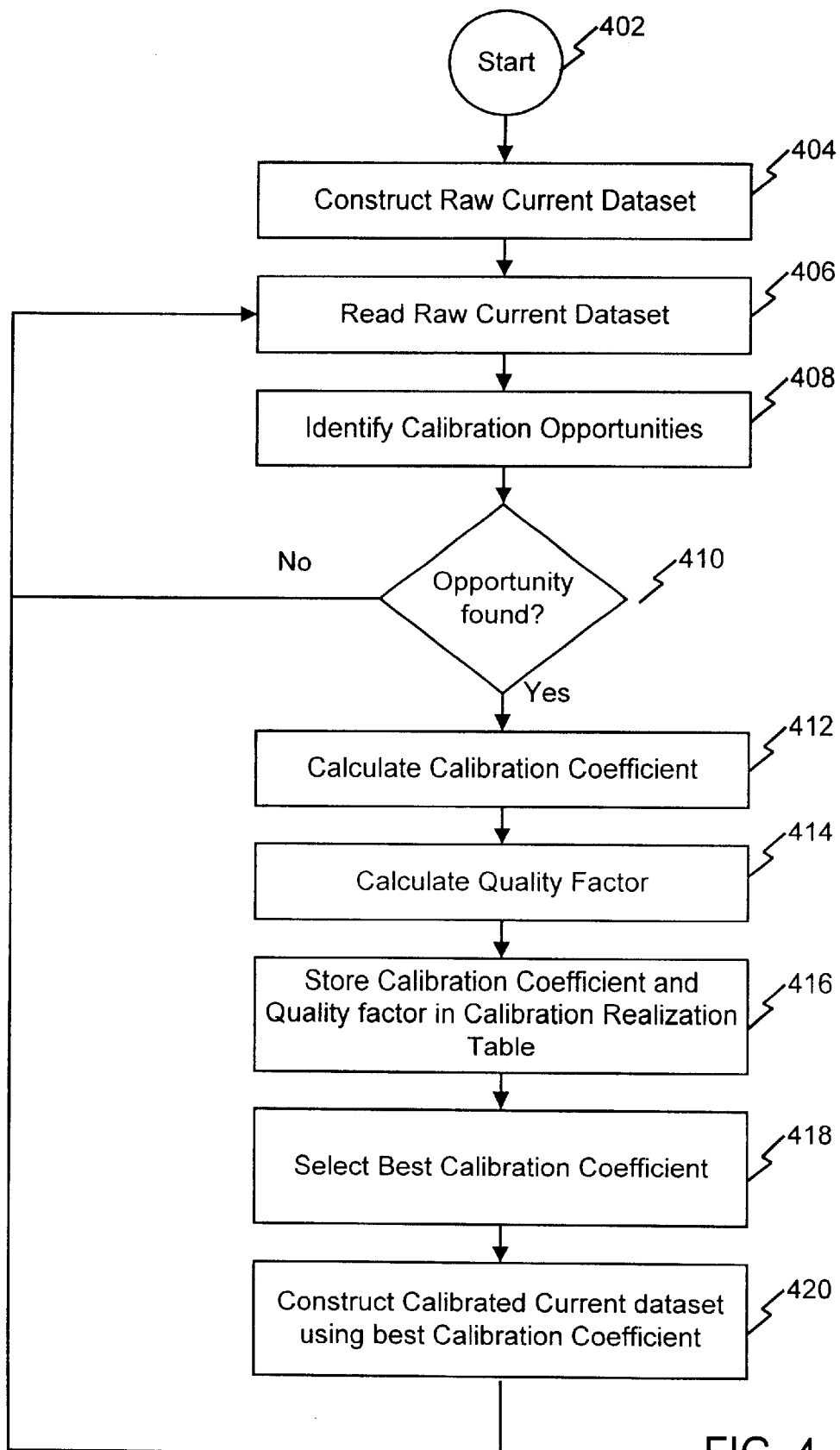
FIG. 4 is a flowchart depicting an overall process according to a preferred embodiment of the present invention.

FIG. 4 is a flowchart depicting an overall process that can be used to implement the present invention. Details pertaining to many of the terms and concepts introduced in the flowchart in FIG. 4 are described in detail below, with reference to the component block diagram in FIG. 5. The process begins with step 404, where a raw current dataset is constructed. A raw current dataset comprises uncalibrated current data as measured by the current sensor 104.

Next, in step 406, the process reads the raw current dataset. In step 408, the process attempts to identify in the raw current dataset, one or more opportunities in which to calculate a calibration coefficient. As described below, this is accomplished by interrogating the raw current dataset and looking for particular pre-defined patterns therein which indicate possible calibration opportunities. This concept is described in detail below.

Next, as indicated by step 410, the process determines if a calibration opportunity is present. If not, control passes back to step 406, where the raw current dataset is again interrogated. If a calibration opportunity is found, then control passes to step 412. In step 412, the process calculates the calibration coefficient in accordance with the raw current dataset and the associated calibration method (such as the calibration methods described above).

Next, as indicated by step 414 a quality factor is calculated. In general, a quality factor is a measure of the data quality associated with the calibration coefficient. Details and examples of methods that can be used to calculate quality factors are described below.

In step 416, the process stores both the calibration coefficient and the quality factor (from steps 412 and 414, respectively), in a storage location referred to herein as the calibration realization table. A calibration realization table typically comprises calibration coefficients and their associated quality factors. Details pertaining to the typical contents and use of the calibration realization table are described below.

Once a calibration coefficient has been selected in step 418, a calibrated current dataset is constructed. As described below, the calibrated current dataset comprises current data which has been calibrated in accordance with the selected calibration coefficient from step 418.

Figure 5:
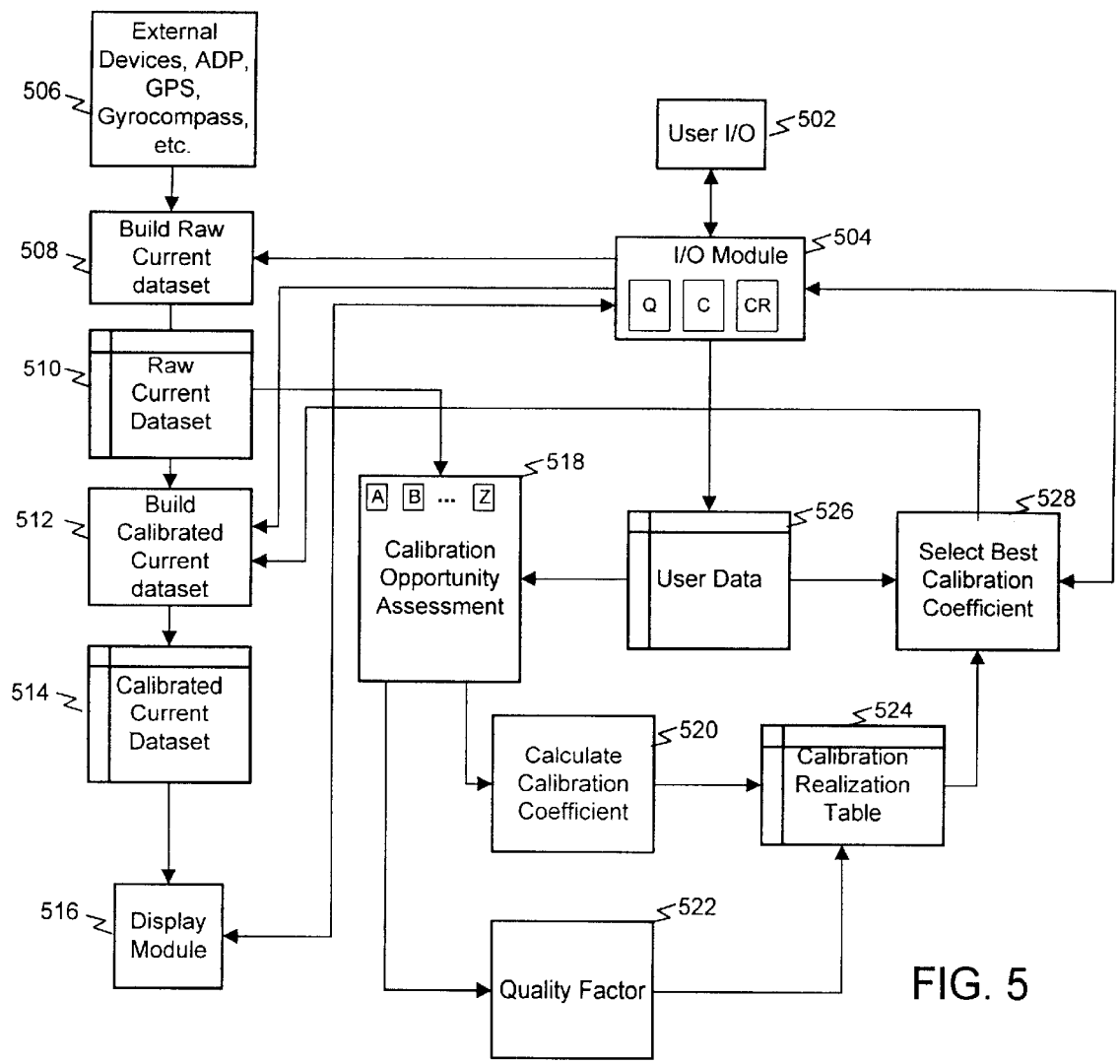
FIG. 5 is a block diagram depicting functional components of the present invention.

FIG. 5 is a block diagram depicting functional components of the present invention. The user input/output (I/O) module 502 represents user input and output from the system. Typically, standard I/O components, such as a keyboard, mouse, printer, display screen and the like are available to the user from this interface. The I/O module 504 comprises methods for interacting with the user at the user interface 502. The three sub-modules, labeled "Q", "C" and "CR", represent modules that are used to display and accept answers to a questionnaire, accept commands from the user, and interact with a display of the calibration realization table 524, respectively. Each of these functions and concepts are fully described in detail below.

The build raw current dataset 508 accepts input from external devices 506, such as the ADP 104, the GPS receiver 202 and the gyrocompass 204. The output from the build raw current dataset 508 is the raw current dataset 510. In operation, the build raw current dataset module 508 uses the data from the external devices 506 to construct the raw current dataset 510. This is preferably performed on a continuous basis, but can be user adjusted in alternate embodiments of the present invention.

The raw current dataset 508 comprises a plurality of records, each comprising a plurality of data fields. An example of a set of data fields found in a typical raw current dataset 510 include: location data (LAT/LON); depth; ship heading; ship travel velocity; current velocity; and a time/date stamp. Note that in all cases, the term velocity includes both a magnitude and a direction.

Typically, the build module 508 either records all raw data or it constructs records at periodic fixed intervals of time. In one embodiment, as indicated, user input is used to define the periodic interval of time used by the build module 508.

Typically, a user inputs this data command via an input device 502, such as a keyboard or the like. In another embodiment, the periodic time interval is preset by the system and cannot be changed by the user. Other parameters, such as the set of depths that are to be used for measurements can be input via the I/O module 504.

The system of the present invention also includes a build calibrated current dataset module 512. The build module 512 is activated by the input selection module 528, whenever a calibration coefficient is selected. A description of the selection module 528 is described in detail below.

As indicated, the raw current dataset 510 is used as input to the build calibrated current dataset module 514. The output from the build dataset module 512 is the calibrated current dataset 512. The calibrated current dataset 512 comprises current data, which has been calibrated in accordance with a particular calibration coefficient. The number of records and the fields within those records may correspond on a one-to-one basis with the raw current dataset 510, or may be a subset thereof. This depends on each specific implementation of the present invention. Typically, some of the parameters used to define the contents of the calibrated current dataset 514 are input from the user, as indicated.

A display module 516 is coupled with the calibrated current dataset 514. The display module is used to display the calibrated current dataset 514 upon a command from the user 502, as indicated.

A calibration opportunity assessment module 518 is coupled to the raw current dataset 510 and the user data 526. The calibration opportunity module 518 continuously processes the raw current dataset 510 to look for opportunities for computing a calibration factor using one of the predefined methods. The predefined methods are represented by the blocks labeled A, B, . . . Z, within the calibration opportunity module 518.

In one example, suppose the methods A–D as outlined above, are supported by a particular embodiment of the present invention. In this case, the calibration opportunity module 518 continuously evaluates the raw current dataset 510 to determine if any of the data segments therein are suitable for performing one or more of the calibration methods A–D. Preferably, each of the methods implemented in a particular embodiment of the present invention are executed in parallel and run independently of each other. Each of these methods (A–D) run independently to determine whether an opportunity exists for performing the associated calibration method. If an opportunity is found to exist, the calculate calibration coefficient module 520 is activated, as described below.

An example of a method that could be used to implement the calibration opportunity assessment module 518 for method A is as follows. It should be recalled that calibration method A uses the assumption that currents are equal if a ship travels the same path in opposite directions within a short period of time. Thus, to implement this method, the calibration opportunity module 518 interrogates the raw current dataset 510 and looks for a pattern suitable for performing method A.

In particular, the module 502 looks for a pattern in which the ship reverses course within a short period of time and travels along the same path but in the opposite direction. A more detailed example of this method and additional methods that can be used to implement this feature of the calibration opportunity module 518 is subsequently described below.

Note that the calibration opportunity assessment module also uses as input, the user data 526. Preferably, users can over-ride and specify a particular calibration method to be used at any time. For example the user can force a particular calibration method to be used at a particular time.

In another example, the user may wish to perform method A, after just completing, (or while completing) a calibration run. In addition, using this technique the user can indicate that a calibration run is about to begin. This command, for example, is used in a preferred embodiment, not only to define a particular data segment to use for method A, but to cause the display module 516 to display the current path to assist in making the calibration run. An example of such a display is described below with reference to FIG. 9.

In addition, the user may specify which calibration methods not to use at any particular time. For example, an ocean-going vessel in very deep water may rule out method B, because bottom-tracking is not possible. In another example, a user eliminates method D from being considered for a particular run.

In one embodiment, the user interface 502 and the I/O module 504 is used to generate user data 526 based on answers to a questionnaire. For example, in one embodiment, the present invention guides the user through a series of questions. The answers to those questions, stored in the user data module 526, enable the calibration opportunity assessment module 518 to make intelligent decisions as to which assumptions are optimal for a particular run, and therefore, which methods to use. An example of a display of one such questionnaire is shown below.

TABLE 2

Example Questionnaire

1. Are you able to turn the ship around in order to run reciprocal courses? Yes [ ] No [ ]
2. How long will it normally take you to turn around and begin to retrace a previous course in the reverse direction? [ ] minutes
3. What is the typical strength of tidal currents in your survey region? [ ]
4. What is the typical strength of non-tidal currents in your survey region? [ ]
5. What is your normal cruise speed? [ ]
6. What is the depth of the hull where the transducer is installed? [ ]

In this example, a 'NO' answer to question 1, indicates that method A is not possible. Therefore, the calibration assessment module 518 does not search for instances to use method A. In fact, in this example, the answers to the first three questions bear on the present invention's ability to use Method A. For example, if the ship is willing and able to turn around to perform reciprocal calibration runs, it may take too long given the typical tidal currents. In this case, the present invention may suggest that the ship rely on Method C or D instead.

The answer to question 4 could influence the intrinsic rating factor (described below) given to several of the methods. The answer to question 5 influences threshold velocities used in implementing methods C and D. The answer to question 6 influences the relative value of Methods A and B. For example, if the hull is relatively shallow and the current sensor observes current that is well below the hull, the system gives method B a higher intrinsic rating.

Sometimes changes are made, which have immediate and sudden influences on the system's calibration. Examples include removing and reinstalling a current sensor 104 or changes to the navigation system. The present invention allows users to note the changes and the time the changes occur so that calibration coefficients are computed accordingly.

It is important to note that users can provide considerable information to assist implementing the methods that form the present invention. Further, users can enter input in terms that make sense to them even if they know nothing at all about how the methods work.

The output from the calibration opportunity assessment module 518 is the calculation module 520. The calculation module 520 calculates the calibration coefficient by solving the appropriate equations as described above. This calculation module 520 is given pointers to the data segment(s) associated with each calibration opportunity, so the appropriate averaging and equation solving can be performed. Once a calibration coefficient has been determined, it is output to a calibration realization table 524, which is described below.

The quality factor module 522 computes a qualify factor associated with each calibration coefficient determined by the calculation module 520. The quality factor is also output to the calibration realization table 524, described below. The quality factor is a measure of the data quality associated with the calibration coefficient.

Quality values are calculated in accordance with pre-defined quality criteria. Each method used to calculate a calibration coefficient produces its own quality factors. The underlying requirement for quality factors is that each factor be designed so that it increases as the quality improves.

It is always possible to create ratings that increase with improving quality. Perhaps the simplest approach is to use a threshold criterion. Consider, for example, a method that requires data from two successive data segments. Thus, one can apply a threshold criterion in which the quality factor is one as long as the time between segments is less than the threshold, and zero otherwise. Later, one may discover later that the algorithm can be improved by making the quality factor fall monotonically as the time interval grows beyond this threshold.

Calibration quality may be assessed in terms of how well the environmental conditions in which the calibrations are made match the underlying assumptions. For example, method A performed in an area of strong tidal currents are not be as good as the same calibration performed in an area where currents are either weak or steady. Thus, the user data 526 derived from the questionnaire as described above, can be used by the quality module 522 to help in determining the quality factor. In another example, method B calibrations may not work very well when the bottom appears to move, such as the case with flooding rivers and the like. Method E would not work very well in a limited area of strong, slowly varying currents.

In each case, the quality factor module 522 measures the underlying environmental conditions, either during the calibration run, or during the overall survey. As noted in a preferred embodiment of the present invention, user input 502 is used to assist in this evaluation as well.

In another example, calibration quality is assessed by the quality of the courses used for the calibration runs. For example, method A requires ships to run the same course in opposite directions with little delay. In this example, the quality module 522 measures and evaluates the length of the course, the distance between opposite courses, and the time separating the two runs. Each of these factors is weighted to determine an overall quality factor. For example, the longer the time between runs, the lower the quality factor. The further apart in space between the first and second runs, the lower the quality factor.

For method C, the quality module 504 measures the time it takes for the ship to come to a stop. The longer it takes for the ship to come to a stop, the lower the quality factor. In method D, the quality module 504 assesses the time required to slow down, the time spent at the slower speed and the stability or the velocity after it slows down.

Once a quality factor is determined by the quality module 522, it is stored along with the associated calibration coefficient in the calibration realization tale 524.

The calibration realization table 524 comprises one record for each calibration factor realized by the calibration module 520. The calibration realization table 524 typically comprises calibration coefficients and their associated quality factors. Preferably, additional information pertaining to each realization of a calibration coefficient is also stored in the calibration realization table 524. The actual contents of the calibration realization table 524 are dependent upon each specific implementation of the present invention. However, every calibration realization table contains at least a list of calibration coefficients. It should be noted however, that not every calibration coefficient needs to be stored in the calibration realization table, as some may be filtered out, for example, based on the quality factor.

As stated R is a complex calibration coefficient that includes a scale factor (the magnitude of R) and a direction offset (the angle of R). Each entry in the calibration realization table 524 contains a representation of R, typically in the form of a scale factor and an offset.

In addition, each entry typically contains the start/stop intervals used to perform the calibration (i.e. pointers that describe the particular data segment within the raw dataset 510 associated with the calibration coefficient). Other entries in the calibration realization table 524 include data that is specific to the particular method or technique associated with the calibration coefficient. For example, for a calibration coefficient using method A, the table 524 preferably comprises data describing the calibration run paths, such as the path length, the time between runs, and the angle or distance between the runs.

The selection module 528 is used to select the best calibration coefficient from the calibration realization table 524. Upon selection of a particular calibration coefficient, the build module 512 is activated so that a new calibration current dataset 514 is constructed, and if desired, displayed by the display module 516.

Many methods can be used to select the best calibration coefficient, including user data as indicated. The present invention computes calibration one or more quality factors for each available calibration method. Along with each method, the present invention combines all available quality factors into a single rating for each calibration, as shown below. The selection module 528 then selects the best calibration based on the method with the highest rating.

Preferably, one obtains each rating as a function of the various quality factors. Typically, this function starts simple and becomes more sophisticated as more is learned from experience with the present invention. One simple approach is to design the quality factors such that better quality turns into larger factors. The total rating is then the product of all applicable quality factors.

The algorithms for comparing different calibration methods are poorly defined today because people today have neither the time nor the wherewithal to compute large datasets of calibration realizations. Without large datasets, it is difficult to compare and evaluate the different methods. The present invention, however, facilitates the creation of large datasets, which will in turn, rapidly improve the algorithms available to incorporate into the present invention.

In addition, the user can manually select a particular calibration coefficient. This is preferably accomplished by displaying a representation of the calibration realization table 524 upon a command from the user via the I/O command module 504.

An example of a calibration realization table display is shown below in Table 3.

TABLE 3

Calibration Table Display

|  | Method A | Method B | Method C | Method E | Method F |
|---|---|---|---|---|---|
| Intrinsic quality | 10 | 7 | 0 | 2 | 3 |
| Offset, QF | 67.2, .9 |  | 69.2, .2 | 70.6, .5 | 71.6, .7 |
| Offset, QF | 66.5, .8 |  | 65.1, .3 |  |  |
| Offset, QF | 68.9, .7 |  | 71.6, .8 |  |  |
| Offset, QF | 66.8, .9 |  | 77.1, .5 |  |  |
| Offset, QF |  |  | 58.1, .4 |  |  |
| mean | 67.35 |  | 70.75 | 70.6 | 71.6 |
| std. dev. | 0.9 |  | 4.3 |  |  |
| Total quality rating | 17 | 0 | 0 | 2 | 3 |

In this example, the table includes the direction offset component of the calibration coefficient. In other embodiments the table includes other parameters such as scale factors or start/stop times. Preferably, the table is implemented with radio buttons, selection boxes, menu choices and the like to enable users to click on a cell and display additional information for a given calibration realization. In addition, in a preferred embodiment, the user can export the raw data in a format readable by other systems.

As shown, the calibration realization table 3 also includes statistical data, such as averages and standard deviations. For example, the mean offset for the five realizations for method A, is 67.35 degrees. Further, the standard deviation is 0.9. Typically, a lower standard deviation indicates higher quality data.

As can be seen by the above table 3, multiple realizations have been performed by the various methods. In this example, method A was realized 5 times, method C, 4 times, and methods E and F, one time each.

Multiple realizations of a given calibration method enable the present invention to assess the method's stability through the statistical properties of the calibration-results. For example, Methods A and B (the standard reverse course method and the bottom tracking method), may be repeated from time to time. Method C (the stop and start method) naturally provides many realizations in many cases. Method D lends itself to multiple realizations, but the ship's captain must be instructed to slow down the ship periodically. Multiple realizations of methods E and F (long term in-situ and radiator patterns) could be performed by breaking the large dataset into multiple subsections. Method G (offset of the current sensor) may be most useful as a means to detect sudden changes in the installation angle of the current sensor, for example after removal and reinstallation.

Thus, when calibration methods provide multiple realizations, the variance of computed calibration factors are used as a rating factor. Since small variance corresponds to better quality, one could define a quality factor proportional to the inverse of the variance (with a sensible maximum factor).

As noted by the first column in Table 3, each entry includes an intrinsic quality rating. The intrinsic quality ratings are used to take advantage of the fact that it could be predicted that some methods will perform better than others in particular situations. Thus, based on user expectations, users can assign each method an intrinsic quality factor. Methods that are expected to produce better results are given higher intrinsic quality factors. Methods in which the user chooses not to use are given a quality factor of zero.

In one embodiment, user input via answers to the questionnaire as shown in Table 2, is also used to determine the intrinsic quality rating. The intrinsic quality ratings allow one to define simple rules, for example, "any method A calibration is better than a method E calibration". This is accomplished by giving users the ability to change the quality ratings intrinsic to each method. In the example given in Table 3, the user has forced the exclusion of Method C by setting its intrinsic quality factor equal to zero.

As stated, the quality factor, as determined by the quality module 522, is also included in the calibration realization table 524. In addition, an overall quality rating is included. Typically, the overall quality rating is determined based on a simple formula that takes into account the averages quality factor, the standard deviation and the intrinsic quality factor. Typically, if the quality factor for a particular realization is particularly low, it is discarded and not used in these calculations.

Details of several methods that can be used to implement procedures for determining calibration opportunities will now be described for methods A–D, with reference to FIGS. 6–9. These procedures can be implemented within the calibration opportunity assessment module 518, as described above. Note that in the descriptions below, parameters that are italicized are preferably parameters that can be adjusted by the user, for example, via the user I/O module 502 or by changing initialization files. Note that these parameters are italicized only the first time they appear in the descriptions to indicate that once a value is selected, it remains constant throughout the particular instance of the procedure.

Figure 6:
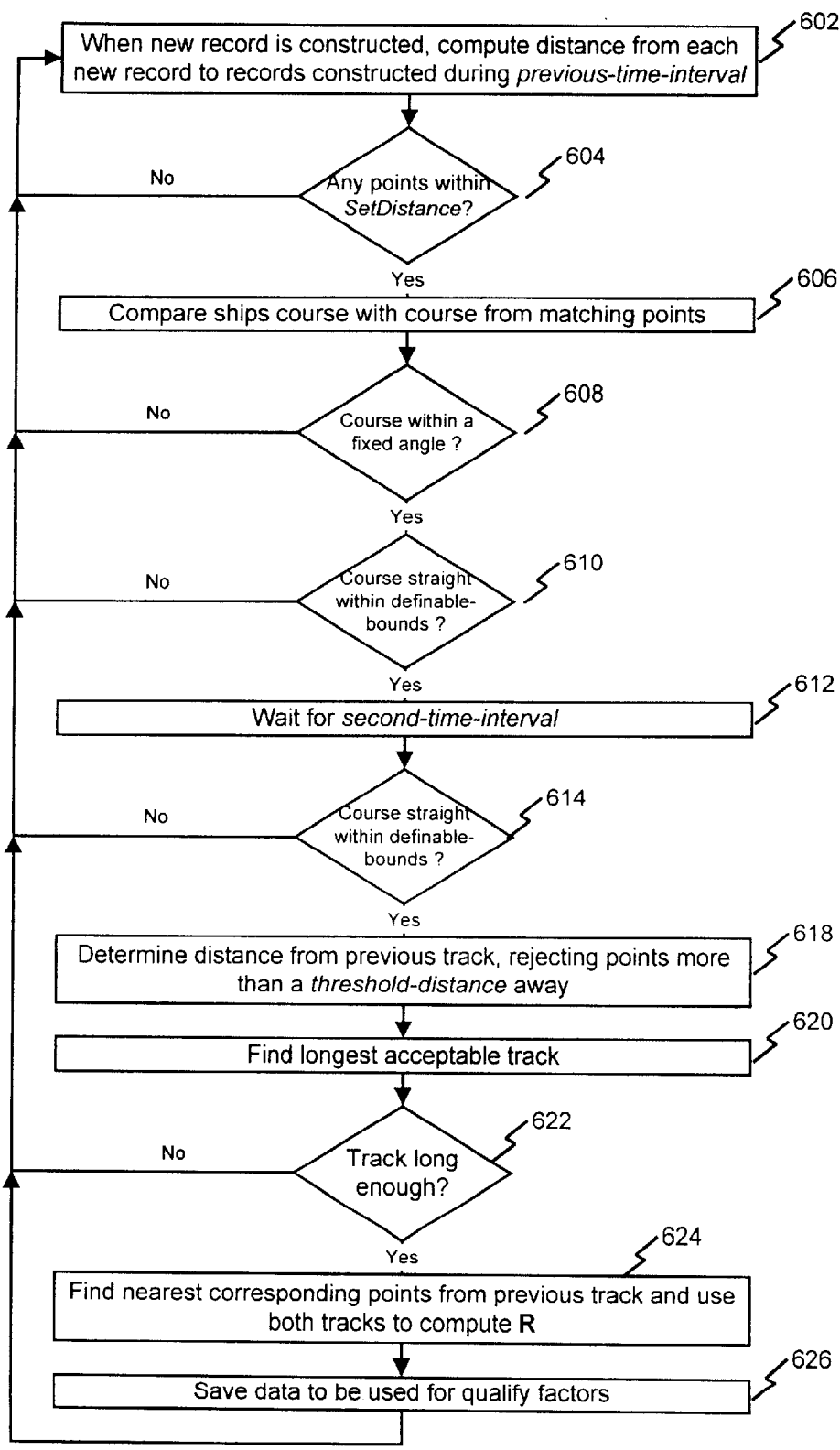
FIGS. 6, 7 and 8 are flowcharts depicting processes that can be used to implement calibration assessment opportunity methods in accordance with an embodiment of the present invention.

FIG. 6 is a flowchart that depicts a process that can be used to determine a calibration opportunity associated with method A, as described above. It should be recalled that method A requires that a calibration run in which the vessel travels the same path, but in opposite directions, within a short period of time. In method A, the currents are assumed to be equal for both segments of the calibration run.

The process begins with step 602, where the process computes the distance from each new record in the raw current dataset 510 to each of the records obtained during a previous time-interval. As indicated by step 604, if any of these points are within a set-distance from the most recent point, control passes to step 606. If not, a calibration opportunity does not yet exist and the process loops back to the beginning, at step 602.

In step 606, the process compares the ship's course. As indicated by step 608, if the course is within a fixed-angle of the opposite direction, control passes to step 610. If not, a calibration opportunity does not yet exist and the process loops back to the beginning, at step 602.

In step 610, the process checks that the course during time-interval has been straight within definable-bounds. As indicated if the course has been straight enough, control passes to step 612, where the process waits for a second-time-interval. If the path is not found to be straight, a calibration opportunity does not yet exist and the process loops back to the beginning, at step 602.

After waiting for a second-time-interval, the process begins continues with step 614. In step 614, the process determines if the course during second-time-interval is also straight within definable-bounds. If not, a calibration opportunity does not yet exist and the process loops back to the beginning, at step 602.

If the course is within definable-bounds, control passes to step 618. In step 618 the process checks each record to determine its distance from the previous track and interpolates between points, if necessary. Typically, any points that are more than a threshold-distance from the previous track are rejected. Next, in step 620, the process finds the longest acceptable track and as indicated by step 622, makes sure the track is long-enough. If not, a calibration opportunity does not yet exist and the process loops back to the beginning, at step 602.

Next, as indicated by step 624, the process finds the nearest corresponding points from the previous track, and uses both tracks to compute R. Next, in step 626, the process stores data related to quality factors including the mean time difference between the tracks, the RMS distance between tracks and the duration of the tracks. As noted, the quality module 522 uses this information to determine a quality factor. As indicated, the process next loops back to the beginning to look for another calibration opportunity.

Figure 7:
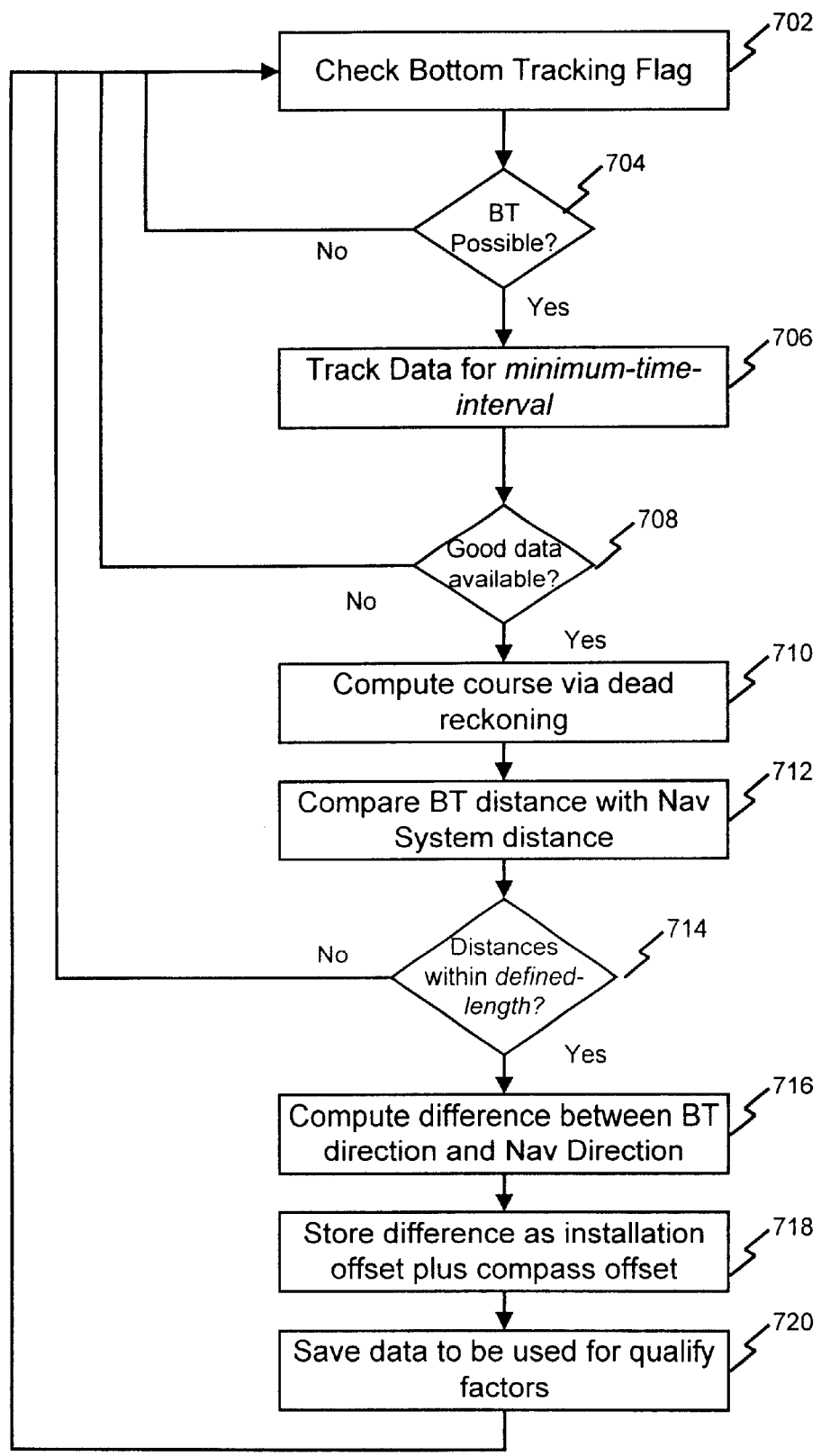

FIG. 7 is a flowchart that depicts a process that can be used to determine a calibration opportunity associated with method B, as described above. It should be recalled that method B requires that bottom tracking be available to determine the offset of the transducer 104. Bottom tracking is only available if the water depth is below a certain threshold associated with the range of the transducer 104.

The process begins with step 702, where the process determines if bottom-tracking is available. As indicated, this is typically accomplished by checking a bottom-tracking flag. Generally, bottom-tracking systems provide such flags to indicate when bottom-tracking (BT) is possible. If bottom-tracking is not possible, then a calibration opportunity does not exist and control passes back to step 702. As indicated by step 706, if BT is possible, the process begins to keep track of the data. Next, as shown in step 708, the process determines if good data is available for a minimum-time-interval. If not, a calibration opportunity does not yet exist and the process loops back to the beginning, at step 702.

If good data are available, the process continues with step 710. In step 710, the process computes the course traveled via dead reckoning, in which BT velocity is combined with the ship's compass data. Next, as indicated by step 712, the BT distance traveled is compared with the distance traveled based on the navigation system data. As indicated by step 714, the process determines if the two distances compared in step 712 are within a defined-length. If not, a calibration opportunity does not yet exist and the process loops back to the beginning, at step 702.

However, if step 714 determines that the two distances are within the defined-length, the data is accepted and the difference between the BT direction with the navigation direction is computed. This difference is the installation offset of the transducer plus the compass offset. As indicated by step 718, this valued is stored. Next in step 720, data used to calculate a quality factor are also saved. This data includes the distance traveled, the difference and the direction.

Figure 8:
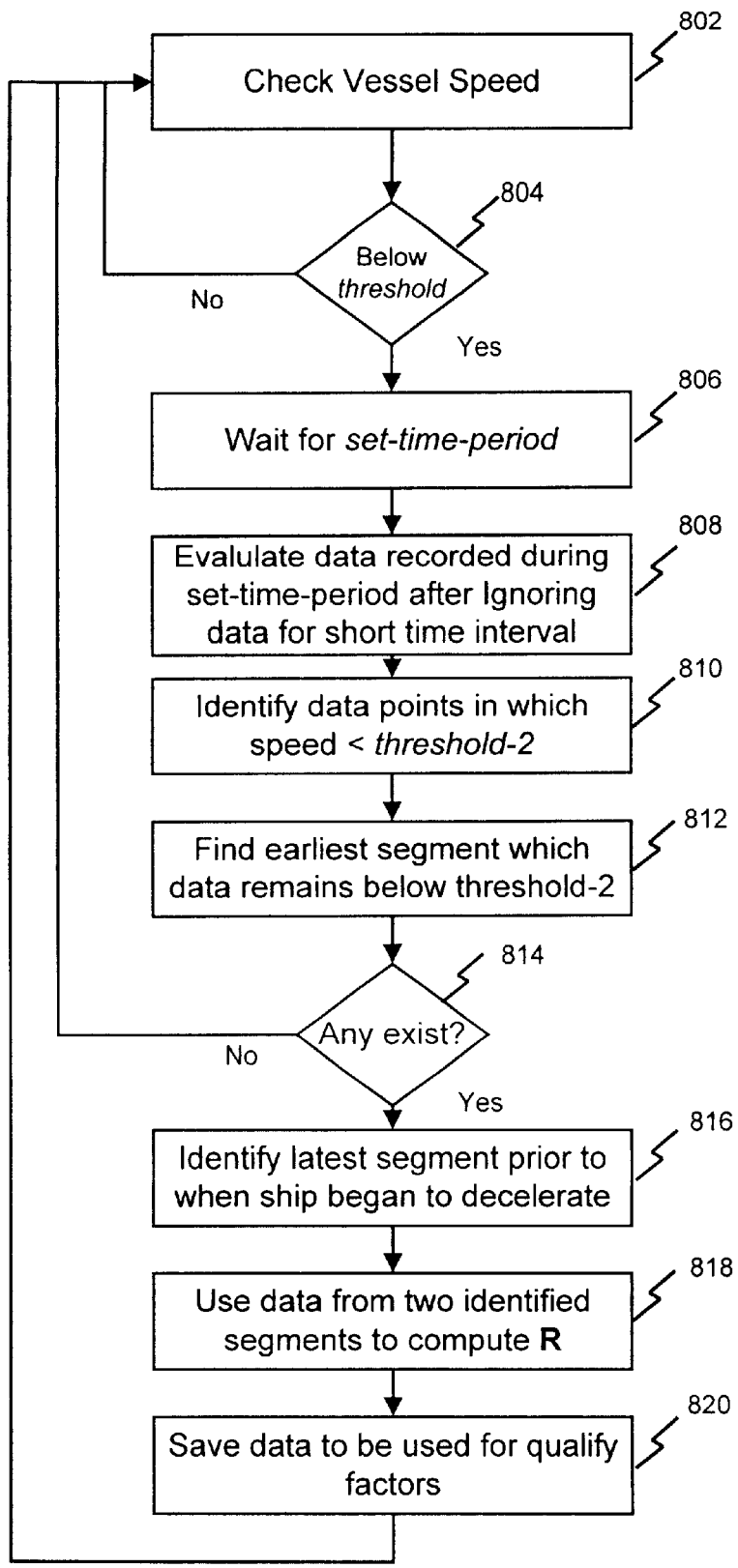

FIG. 8 is a flowchart that depicts a process that used to determine a calibration opportunity associated with method C, as described above. It should be recalled that method C involves a ship stopping for a period of time.

The process begins with step 802 in which the vessel speed is observed. The process determines whether the ship is cruising with a steady speed and verifies that the velocity has remained above a threshold-velocity for a least a minimum-duration. Next, as indicated by step 804, the process determines whether the speed is below a threshold-velocity (which may be computed as a fraction of the recent mean cruising speed). If it is not, a calibration opportunity does not yet exist and the process loops back to the beginning, at step 802.

If the speed does fall below the threshold-velocity, the process waits a set-time-period, as indicated by step 806. Next, as indicated by step 808, the process evaluates the data recorded during this set-time-period. It first ignores data from a defined short-time-interval at the beginning of the set-time-period. Next, as indicated by step 808, the process ignores the data for a defined short time interval.

Next, as indicated by step 810, the process identifies all remaining data in which the vessel speed is less than a threshold-velocity-2. Control next passes to step 812. In step 812, the process finds the earliest segment that is at least as long as the minimum-duration during which all the data remain below this threshold-velocity-2 (if such segment any exists).

Next, as indicated by step 814, the process checks that a minimum-duration segment exists. If it does, control passes to step 816. If not, a calibration opportunity does not exist and the process loops back to the beginning, at step 802.

Next, as indicated by step 816, the process looks back to a time prior to when the speed fell below threshold-velocity and identifies the latest segment of a duration at least as long as the minimum-duration, prior to when the ship began to decelerate. The start of deceleration may be determined, for example, by a suitable filtering algorithm. Next, in step 818, the process uses the data from the two identified segments from steps 812 and 816 to obtain a calibration coefficient R. Next, as indicated by step 820, quality factor data is saved, including the mean time difference between the two segments.

It should be noted that a simple variation of the above method can be used to implement method D, which requires that a ship changes speed for a duration of time, rather than coming to a complete stop.

Figure 10:
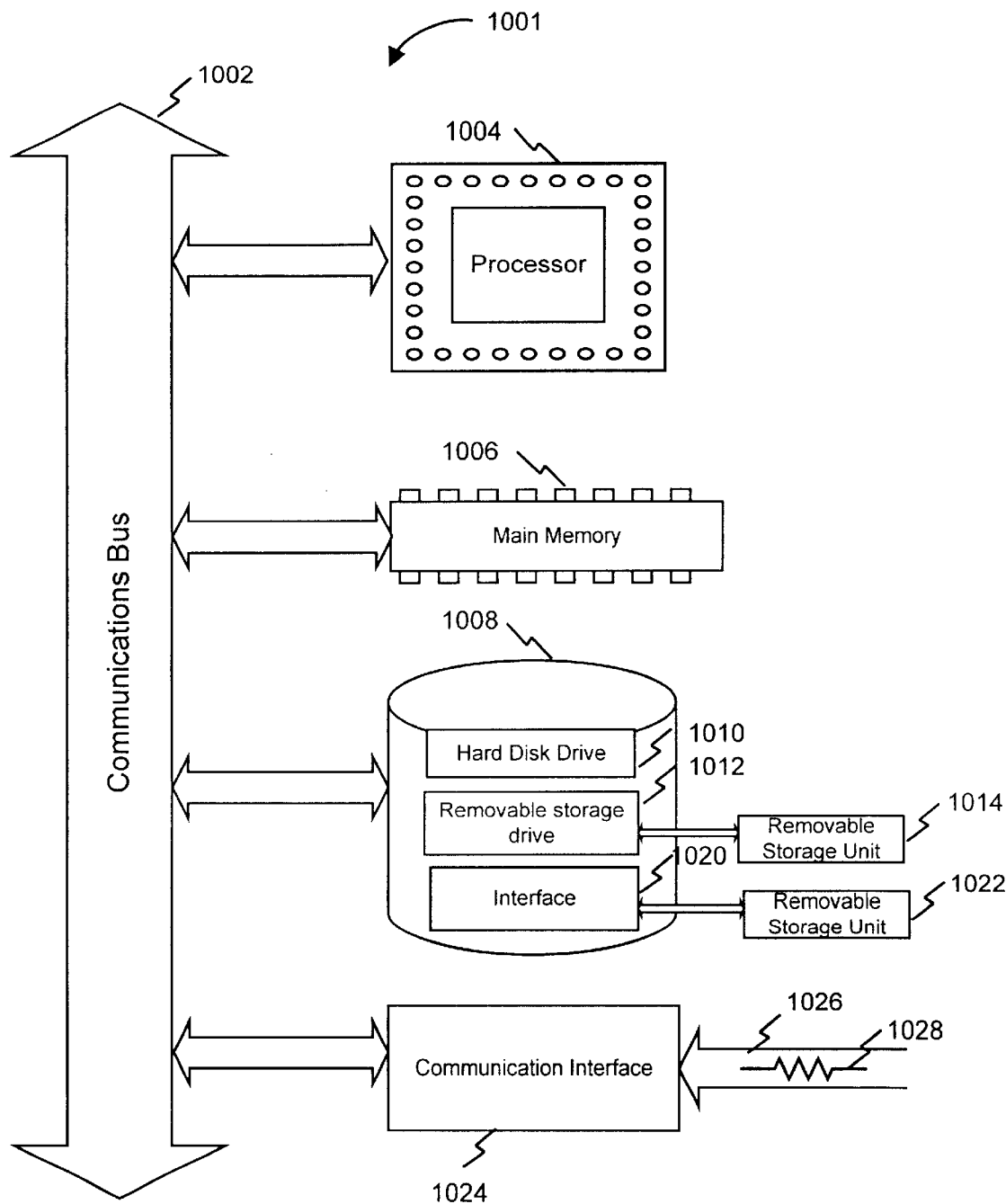
FIG. 10 is a block diagram of a computer that can be used to implement components of the present invention.

The present invention may be implemented using hardware, software or a combination thereof and may be implemented in a computer system or other processing system. In fact, in one embodiment, the invention is directed toward a computer system capable of carrying out the functionality described herein. An example computer system 1001 is shown in FIG. 10. The computer system 1001 includes one or more processors, such as processor 1004. The processor 1004 is connected to a communication bus 1002. Various software embodiments are described in terms of this example computer system. After reading this description, it will become apparent to a person skilled in the relevant art how to implement the invention using other computer systems and/or computer architectures.

Figure 9:
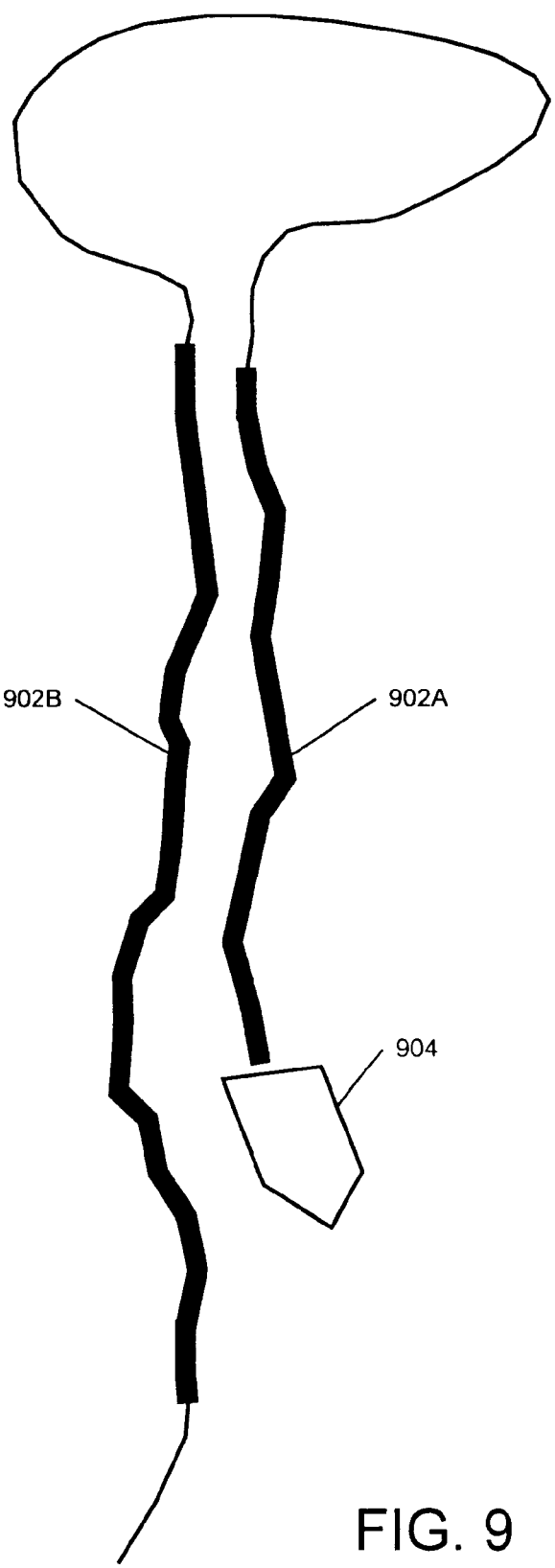
FIG. 9 is an example of a display used for making a calibration run, according to an embodiment of the present invention.

FIG. 9 is an example of a real-time display that can be used, for example, during a method a calibration run. This display is called at the discretion of the user via the user interface 502 and the display module 516. The bold lines 902 indicate the segments suitable for the calibration run. The fact that the segment 902A immediately behind the ship 904 in this figure is bold indicates that it meets the minimum requirements. The fact that the bold segment 902B on the left is longer indicates that the calibration may be improved by continuing further. It also indicates when further steaming is no longer helpful. In one embodiment, a real-time readout is presented along with the display in FIG. 9, which lists quality factors as well as an overall rating factor for the run. Typically, users utilize this information to learn how to optimize their runs.

Computer system 1002 also includes a main memory 1006, preferably random access memory (RAM), and can also include a secondary memory 1008. The secondary memory 1008 can include, for example, a hard disk drive 1010 and/or a removable storage drive 1012, representing a floppy disk drive, a magnetic tape drive, an optical disk drive, etc. The removable storage drive 1012 reads from and/or writes to a removable storage unit 1014 in a well known manner. Removable storage unit 1014, represents a floppy disk, magnetic tape, optical disk, etc. which is read by and written to by removable storage drive 1012. As will be appreciated, the removable storage unit 1014 includes a computer usable storage medium having stored therein computer software and/or data.

In alternative embodiments, secondary memory 1008 may include other similar means for allowing computer programs or other instructions to be loaded into computer system 1001. Such means can include, for example, a removable storage unit 1022 and an interface 1020. Examples of such can include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1001.

Computer system 1001 can also include a communications interface 1024. Communications interface 1024 allows software and data to be transferred between computer system 1001 and external devices. Examples of communications interface 1024 can include a modem, a network interface (such as an Ethernet card), a communications port, a PCMCIA slot and card, etc. Software and data transferred via communications interface 1024 are in the form of signals which can be electronic, electromagnetic, optical or other signals capable of being received by communications interface 1024. These signals 1026 are provided to communications interface via a channel 1028. This channel 828 carries signals 1026 and can be implemented using wire or cable, fiber optics, a phone line, a cellular phone link, an RF link and other communications channels.

In this document, the terms "computer program medium" and "computer usable medium" are used to generally refer to media such as removable storage device 1012, a hard disk installed in hard disk drive 1010, and signals 1026. These computer program products are means for providing software to computer system 1001.

Computer programs (also called computer control logic) are stored in main memory and/or secondary memory 1008. Computer programs can also be received via communications interface 1024. Such computer programs, when executed, enable the computer system 1001 to perform the features of the present invention as discussed herein. In particular, the computer programs, when executed, enable the processor 1004 to perform the features of the present invention. Accordingly, such computer programs represent controllers of the computer system 1001.

In an embodiment where the invention is implemented using software, the software may be stored in a computer program product and loaded into computer system 1001 using removable storage drive 1012, hard drive 1010 or communications interface 1024. The control logic (software), when executed by the processor 1004, causes the processor 1004 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An automated method for processing and calibrating data collected from a measuring device configured to measure the current of a fluid body, the method comprising the steps of:

reading a raw current dataset;

identifying a particular data segment within said raw current dataset that can be used to determine a calibration coefficient;

calculating a calibration coefficient from said particular data segment; and creating a calibrated current dataset using said calibration coefficient.

2. The automated method of claim 1, further comprising the step of determining a quality factor associated with said calibration coefficient.

3. The automated method of claim 2, further comprising the steps of:

storing said calibration coefficient in a calibration realization table;

storing said quality factor in said calibration realization table;

selecting a calibration coefficient from said realization table; and using said selected calibration coefficient to create said calibrated current dataset.

4. The automated method of claim 3, wherein said step of identifying a particular data segment comprises the steps of:

storing a plurality of predefined criteria used for defining a calibration opportunity; and searching said raw current dataset for a data pattern matching said plurality of predefined criteria.

5. The automated method of claim 4, wherein said quality factor is based on a quantitative measurement of how closely said data pattern matches said plurality of predefined criteria.

6. The automated method of claim 3, wherein said selecting step is based on said quality factor.

7. The automated method of claim 6, wherein said selecting step is further based on a statistical analysis of said calibration realization table.

8. The automated method of claim 6, wherein said selecting step is further based on user input.

9. The automated method of claim 2, wherein said quality factor is at least partially based on user input.

10. The automated method of claim 1, further comprising the steps of:

storing said calibration coefficient in a calibration realization table;

selecting a calibration coefficient from said calibration realization table; and using said selected calibration coefficient to create said calibrated current dataset.

11. The automated method of claim 1, wherein said identifying step is based on user input.

12. The automated method of claim 1, wherein said identifying step is performed in real-time, as said raw current dataset is being constructed.

13. The automated method of claim 1, wherein said identifying step is performed after said raw current dataset has been constructed.

14. A system for processing and calibrating data collected from a measuring device configured to measure the current of a fluid body, comprising;

a first build module for collecting data from the measuring device and at least one external device for creating a raw current dataset;

a calibration opportunity module coupled to said raw current dataset for identifying a data segment that can be used to create a calibration coefficient;

a calculation module coupled to said calibration opportunity module for calculating the calibration coefficient based on said identified data segment; and a second build module, coupled to said raw current dataset and said calculation module for creating a calibrated current dataset using said calibration coefficient.

15. The system of claim 14, further comprising:

a quality module coupled to said calibration opportunity module for creating a quality factor associated with said calibration coefficient.

16. The system of claim 15, further comprising:

a calibration realization table coupled to said calculation module and said quality module for storing said calibration coefficient and said quality factor;

a selection module coupled to said calibration realization table and said second build module for selecting a calibration coefficient in accordance with said quality factor.

17. The system of claim 16, further comprising:

a user database coupled to said selection module for inputting one or more criteria used for selecting said calibration coefficient.

18. The system of claim 14, further comprising:

a user database coupled to said calibration opportunity module for inputting one or more criteria used for identifying said data segment that can be used to create a calibration coefficient.

19. A computer program product comprising a computer useable medium having computer program logic stored therein, said computer program logic for enabling a computer to process and calibrate data collected from a measuring device configured to measure the current of a fluid body, wherein said computer program logic comprises:

reading means for enabling the computer to read a raw current dataset;

identifying means for enabling the computer to identify a particular data segment within said raw current dataset that can be used to determine a calibration coefficient;

calculating means for enabling the computer to calculate a calibration coefficient from said particular data segment; and creating means for enabling the computer to create a calibrated current dataset using said calibration coefficient.

20. The computer program product of claim 19, wherein said computer program logic further comprises determining means for enabling the computer to determine a quality factor associated with said calibration coefficient.

21. The computer program product of claim 20, wherein said computer program logic further comprises means for enabling the computer to store said calibration coefficient in a calibration realization table;

means for enabling the computer to store said quality factor in said calibration realization table;

means for enabling the computer select an optimal calibration coefficient from said calibration realization table; and means for enabling the computer to use said optimal calibration coefficient to create said calibrated current dataset.

* * * * *